(12) United States Patent
Bekelaar et al.

(10) Patent No.: US 7,383,945 B2
(45) Date of Patent: Jun. 10, 2008

(54) CONVEYING UNITS

(75) Inventors: Johannes Michiel Marie Bekelaar, BA Arnhem (NL); Brand Van De Hazel, VE Putten (NL)

(73) Assignee: FPS Food Processing Systems B.V. (NL)

( * ) Notice: Subject to any disclaimer, the term of this patent is extended or adjusted under 35 U.S.C. 154(b) by 135 days.

(21) Appl. No.: 11/171,497

(22) Filed: Jul. 1, 2005

(65) Prior Publication Data

US 2006/0000689 A1    Jan. 5, 2006

(30) Foreign Application Priority Data

Jul. 2, 2004    (EP)    ................. 04076928

(51) Int. Cl.
*B65G 47/04*    (2006.01)
(52) U.S. Cl. .................... 198/867.15; 198/803.14; 198/803.15
(58) Field of Classification Search ............. 198/465.3, 198/867.15, 867.12, 867.14, 803.14, 803.15
See application file for complete search history.

(56) References Cited

U.S. PATENT DOCUMENTS

| | | | | |
|---|---|---|---|---|
| 1,069,901 A | * | 8/1913 | Petersen ................. | 198/803.2 |
| 1,967,213 A | * | 7/1934 | Beplate ................... | 134/127 |
| 2,138,813 A | * | 12/1938 | Bemis ..................... | 99/352 |
| 2,656,032 A | * | 10/1953 | Stern ...................... | 198/465.3 |
| 2,724,482 A | * | 11/1955 | De Francisci .......... | 198/464.1 |
| 3,160,262 A | * | 12/1964 | Nole ....................... | 198/867.15 |
| 3,206,005 A | * | 9/1965 | Lyman ................... | 198/867.14 |
| 3,587,829 A | | 6/1971 | Sorensen | |
| 3,974,624 A | | 8/1976 | Bentley et al. | |
| 4,089,408 A | * | 5/1978 | Vanderhoof ............ | 198/890.1 |
| 4,462,588 A | * | 7/1984 | Kogane .................. | 271/265.03 |

(Continued)

FOREIGN PATENT DOCUMENTS

EP    0 560 458    9/1993

(Continued)

OTHER PUBLICATIONS

Company brochure, "MOBA Mopack Farmpackers, In-line egg packing with Moba's Gentle Touch", 1976.

*Primary Examiner*—Mark A Deuble
(74) *Attorney, Agent, or Firm*—Stites & Harbison PLLC; Marvin Petry

(57) ABSTRACT

An apparatus is provided for transferring products, in particular eggs, comprising at least one height, at least one row of conveying units positioned under an endless sorting conveyor, wherein the products are discharged in a well-defined manner from the sorting conveyor into the conveying units, are received by the conveying units, and are subsequently delivered to a packaging device thereunder. Each conveying unit consists of at least two parts which can move relative to each other, in particular away from each other and back again, from a receiving position for taking up such a product to a discharge position for delivering the product downwardly therefrom. The at least one row is included in a frame and is arranged on one carrier, while the carrier with the row is exchangeable and interlockable, and the carrier is provided with an interlock at the ends of the row. The interlock consists of two fitting connection halves, of which one on the carrier and the other on the frame, and a fit retainer.

Advantageously, this arrangement enables quick and reliable exchange and replacement of such units in large sorting machines.

19 Claims, 4 Drawing Sheets

U.S. PATENT DOCUMENTS 4,467,911 A * 8/1984 Forshee ................. 198/867.15
4,501,351 A * 2/1985 Tracy ................... 198/867.15
4,724,951 A * 2/1988 Shinkawa et al. ..... 198/867.13
5,873,452 A * 2/1999 Nolan ..................... 198/465.3

FOREIGN PATENT DOCUMENTS

EP          1 057 728        12/2000
EP          1 310 429         5/2003

* cited by examiner

CONVEYING UNITS

FIELD OF THE INVENTION

The present invention relates to an apparatus for transferring products and, in particular, an apparatus for transferring products, such as eggs.

BACKGROUND OF THE INVENTION

Transferring apparatuses are generally known from the art of egg sorting machines, for instance from the so-called farmpackers as manufactured since 1976 by the Dutch firm of MOBA under the name of MOPACK. More particularly, the invention concerns that part of such a machine where the eggs are transferred from the main conveyor into a packaging device, such as a packaging box or an egg tray, typically referred to as 'dropset'.

Such an apparatus is also disclosed in EP560458. More particularly, this apparatus is included in a sorting system capable of sorting very large amounts of eggs, up to as many as 120,000 eggs an hour. The portion where the transfer from sorting conveyor to packaging device takes place comprises essentially three heights or levels and consists, in succession, of an upper system of four juxtaposed rows, a second level thereunder, with an endless horizontal buffer conveyor with eleven circulating rows, and thereunder a lower level with one row. These levels are also referred to as 'receiverset', 'bufferset', and, again, 'dropset'.

EP1057728 shows a system comparable to the above system, with the buffer units positioned in a vertical frame instead of in a horizontal buffer conveyor.

In EP1310429, in a similar system, for instance as represented in FIG. 6, there are utilized two highest levels with rows, a horizontal conveyor thereunder, and thereunder one delivery row.

In such machines, with which per unit time large quantities of food products, more particularly natural products such as eggs, or also fruit, are sorted, it almost goes without saying that contamination occurs. In the case of eggs, this involves dirt on the shell, but also egg contents due to leakage upon breakage. Such fouling constitutes a source liable to transmit all kinds of germs. For that reason, in this sector, more and more attention is being given to the cleaning of these machines. The most common procedure to date is for these and other parts of the machines to be hosed down with suitable detergents, or for the above-mentioned parts of such rows to be individually disassembled and cleaned.

SUMMARY OF THE INVENTION

To improve such a laborious procedure, according to one aspect of the invention an apparatus is provided for transferring products, in particular eggs. The apparatus includes at least one row of conveying units, an endless sorting conveyor and a packaging device. The at least one row of conveying units may be positioned under the endless sorting conveyor at least one height. In use, the products may be discharged in a well-defined manner from the sorting conveyor into the conveying units, are received by the conveying units, and may subsequently be delivered to a packaging device thereunder. Each conveying unit may include at least a first and a second part movable away from each other and back again, from a receiving position for taking up such a product to a discharge position for delivering the product downwardly therefrom. One of the at least one row may be included in a frame and may be removeably and interlockably arranged in the frame.

Advantageously, the first parts from one of the at least one row may be mounted on a first carrier and the second parts from the one row may be mounted on a second carrier. For the purpose of making said at least one row removable, said carriers may arranged removeably and interlockably in the frame. The carriers may each be provided with an interlock at the ends thereof. The interlock may include two fitting connection halves, of which one on the carrier and the other on the frame, and a fit retainer. The one half may be a pin provided on either the carrier or the frame. The other half may be a slot provided in either the frame or the carrier and may be fitting around the pin. The fit retainer may be a retaining bush biased around the halves.

Such an interlockable removability of the rows, more particularly of the carriers not only provides the advantage that it considerably simplifies cleaning, for instance by placing such a row in a washing machine, but also makes it possible to remedy defects rapidly. Exchange for a same, identical row then requires neither knowledge nor time and can be carried out directly by the local user himself.

BRIEF DESCRIPTION OF THE DRAWINGS

Further details of the apparatus according to the present invention will be discussed with reference to a drawing, in which.

The same numerals in the four figures designate the same or similar parts or constituents.

DETAILED DESCRIPTION OF EMBODIMENTS

In one advantageous embodiment of the present invention, a row of conveying units may be positioned:

at an upper, first height, immediately under an endless sorting conveyor, functioning as at least one receiving row of receiving units, whereby products are discharged in a well-defined manner from a sorting conveyor into the receiving units and are received by these receiving units, with a receiving position for taking up such a product, and with a discharge position for delivering the product downwardly therefrom.

This embodiment may include a further row of conveying units at least second height under the first height, functioning as at least one intermediate row of buffer units for taking up, buffering, and in turn delivering a product. The buffer units may be similar to the receiving units, for taking up the products from the receiving units and discharging the product downwardly in a well-defined manner.

This embodiment may include a further row of conveying units at a further height under the at least second height, and positioned above a packaging device. The further row of conveying units may function as at least one delivery row of delivery units, for taking up products from the buffer units and delivering the products in a well-defined manner into the packaging devices. The delivery units may be similar to the receiving units and the buffer units.

With great advantage, in such large sorting machines, rows can be exchanged or replaced, without this requiring further disassembly of parts of the frame. It will be clear that this increases the efficiency of such machines considerably.

As described above, the interlock may include two fitting connection halves, of which one is on the carrier and the other is on the frame, and a fit retainer. More particularly, the fitting comprises two halves, where one half is a pin arranged on the carrier, and the other half is a slot provided in the frame and fitting around the pin or vice versa. The fit retainer may be a retaining bush biased around the halves.

The above-mentioned features of the interlock are not only that removal, exchange or replacement can be performed quickly and effectively, but also that a very secure interlock is obtained which, during the many millions of times that a row is used during the lifespan of the device, does not involve any risk of its being undesirably forced from the operative position.

Figure 1:
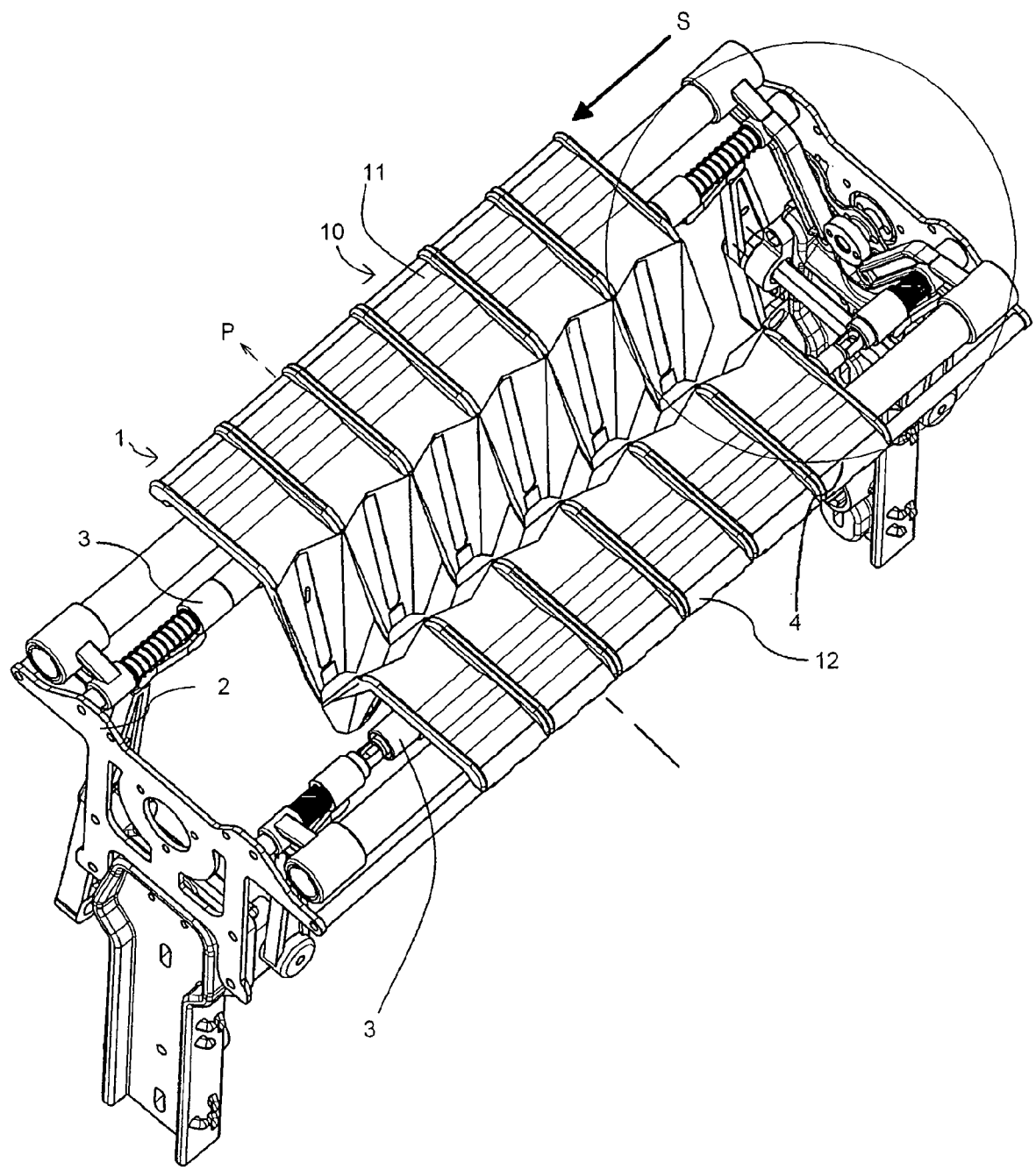
FIG. 1 presents an isometric view of a frame having therein a row with interlock according to the invention.

FIG. 1 schematically shows, in an isometric view taken obliquely from above, a row 1 of conveying units 10, arranged in a frame 2. The conveying units 10 each consist of two parts 11, 12, which, in the position shown, each form a nest for a product, for instance an egg. Arrow S above this row indicates the direction in which the eggs are conveyed by a sorting conveyor. It is generally known, for instance from EP 560458, that the eggs are conveyed with grippers and during sorting are discharged at certain locations. These locations are situated above packaging devices which generally run in a direction following arrow P under these sorting apparatuses. In order to arrange for proper guidance upon transfer of the products, as eggs here, the above well-known rows are positioned between the sorting conveyor and the packaging devices, thus functioning as intermediate station and transfer guide. The above-mentioned parts 11, 12 are represented in FIG. 1 in a closed position, that is, the position when receiving the eggs. At relay and transfer of the eggs, these parts hinge to open, moving slightly apart, whereby the eggs are discharged or released and fall to positions in the packaging devices placed thereunder. The conveying units 10 form a row 1, with the parts 11 and 12 each mounted on a carrier 3. Each carrier with parts 11, 12 mounted thereon is interlocked at each of its ends with an interlock 4.

A frame 2 as depicted forms a part of a sorting machine which is generally considered to comprise the above sorting conveyor, the packaging devices thereunder, and machine parts in-between, of which such a frame mostly forms a part.

Figure 2:
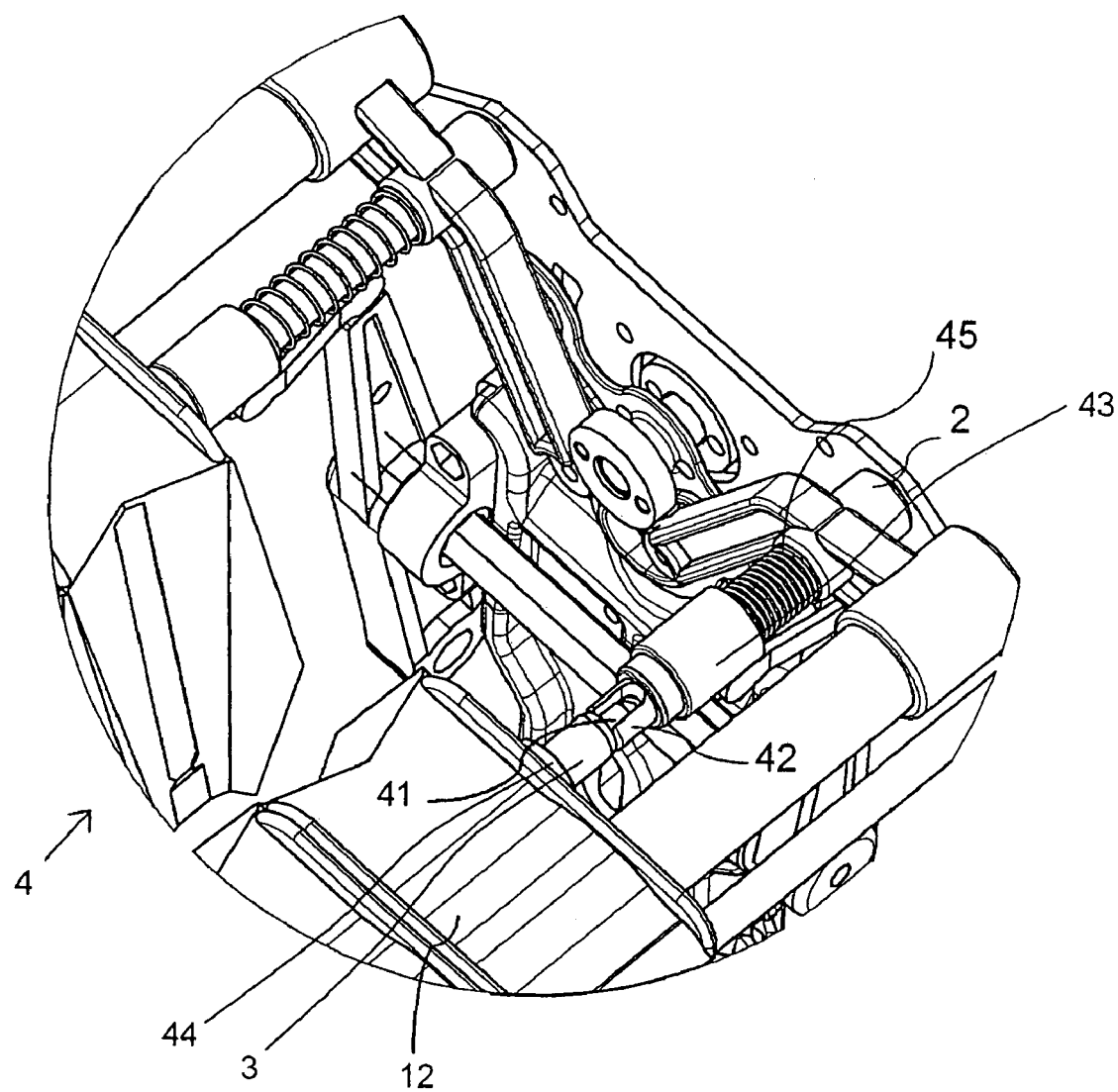
FIG. 2 shows a detail of FIG. 1, in particular, of the interlock.

In FIG. 2, such an interlock 4 is represented in detail. Carrier 3 is a shaft having mounted thereon the parts 12, with the shaft terminating in a pin 41. On the other side, in the frame 2, more particularly in a supporting part thereof, a slot 42 is provided, with the pin 41 as one half and the slot 42 as the other half fitting each other, more particularly the pin 41 fitting into the slot 42. Slidably arranged over these is a fit retainer 43, in particular a retaining bush 43, which is in the position drawn only when slid away against a spring, for instance a helical spring 45 functioning as compression spring and arranged around a supporting part of frame 2. In the biased condition, the retaining bush will always be situated around the halves 41, 42. It is further noted that in the exemplary embodiment shown, the end on the frame 2 is provided with a profile 44 over which the retaining bush 43 biased on the carrier 3 is slipped. Owing to this construction, also when the intermediate distance between the halves 11 (and 12) mutually varies, for instance for adjustment of the intermediate distance to that of the package, the interlock under the bush will never be exposed.

It will be clear to those skilled in the art that when reference is made to an interlock, this involves at least two parts fitting each other, for instance magnetically with an N-pole and an S-pole, or electromagnetically with a positive and a negative pole, or mechanically with an insert part and a receptacle part, with one half provided on the carrier 3 and the other on the frame 2. Accordingly, when it is indicated that the interlock is situated at each end, this is understood to refer to one of the above-mentioned halves.

It will also be clear that biasing can be done from the carrier or from the frame. More particularly, the stop for a spring as mentioned above will be provided either on the carrier or on the frame. The consequence is that, accordingly, the retaining bush as mentioned above either shifts from the carrier over a part of the frame or the other way around.

Figure 3:
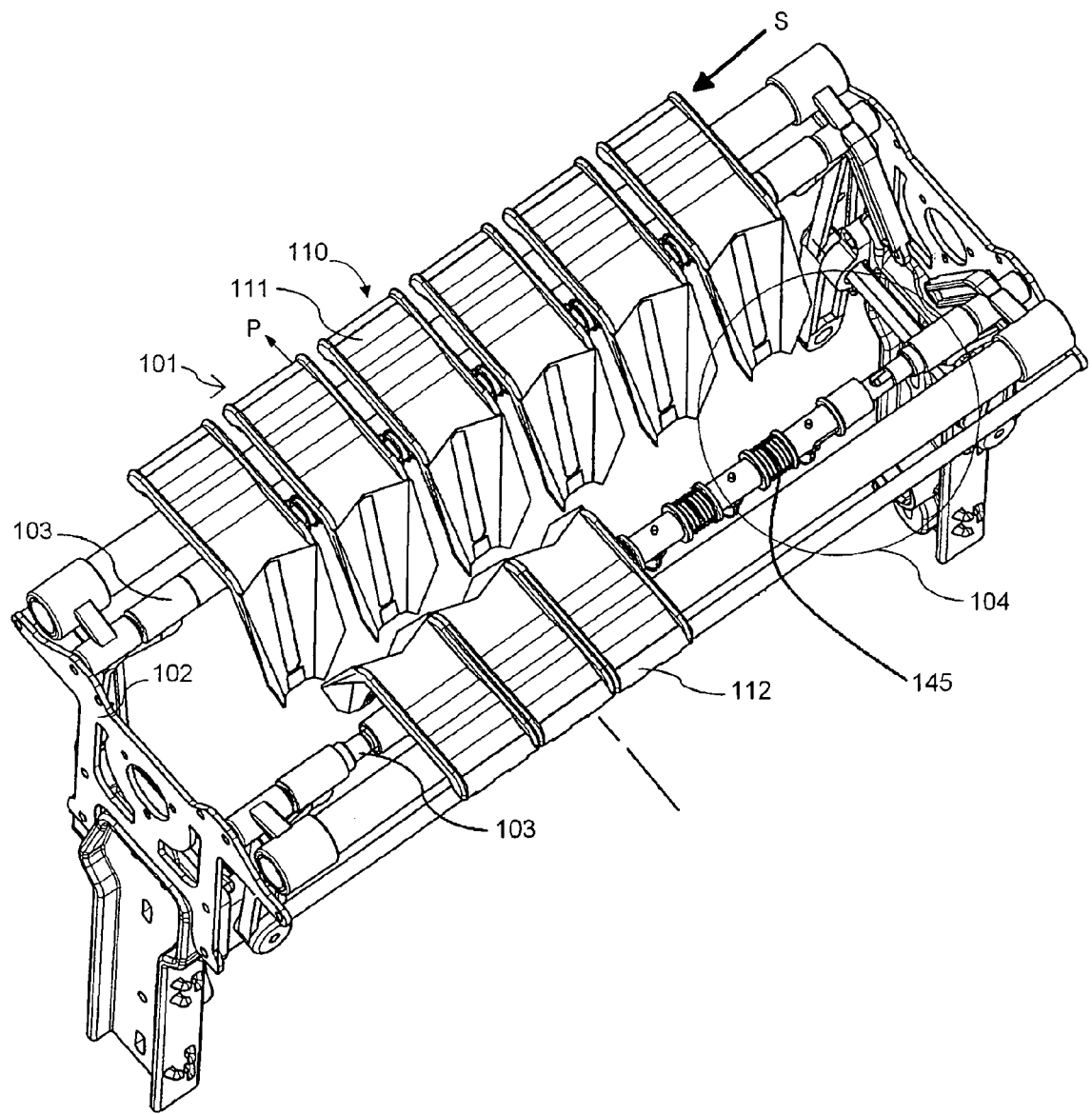
FIG. 3 is an isometric view of another frame and carrier, in accordance with the present invention.
Figure 4:
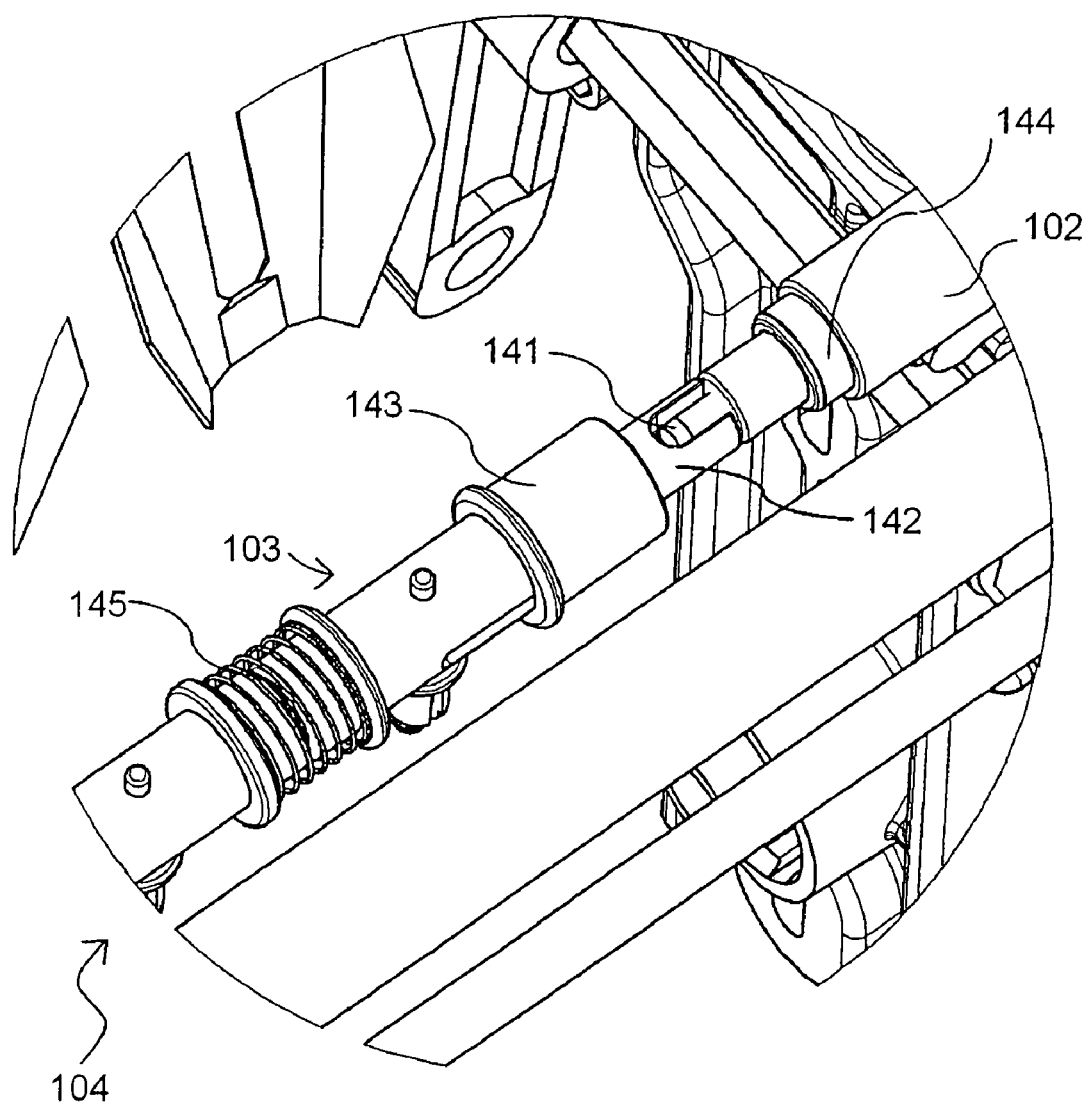
FIG. 4 shows a detail of FIG. 3, in particular, of the interlock.

Accordingly, referring now to FIGS. 3 and 4, along with FIGS. 1 and 2, where, in FIGS. 3 and 4, like elements to those in FIGS. 1 and 2 have been raised by 100, frame 102 has row 101 of conveying units 110 with interlock 104. The apparatus of FIGS. 3 and 4 differs from that of FIGS. 1 and 2 by having the biasing done using a spring 145 located around the shaft of the carrier 103, which biases the retaining bush 143 from the carrier 103 over the fitting and the profile 144 of frame 102, whereas in the embodiment of FIGS. 1 and 2, the biasing is done using a spring 45, located on frame 2, which biases retaining bush 43 over the fitting and the profile 44 of the carrier. Further, in the embodiment of FIGS. 3 and 4, the supporting part of the frame 102 terminates at a pin 141, and the carrier 103 has a slot 142.

Modifications obvious to those skilled in the art are understood to fall within the scope of protection of the appended claims. For instance, instead of a helical spring, a leaf spring or even an air spring can be used.

The invention claimed is:

1. An apparatus for transferring products, said apparatus comprising:
    at least one row of conveying units, an endless sorting conveyor and a packaging device, the at least one row of conveying units being positioned under the endless sorting conveyor at least one height, wherein, in use, the products are discharged in a well-defined manner from the sorting conveyor into the conveying units, are received by the conveying units, and are subsequently delivered to a packaging device thereunder, wherein each conveying unit includes at least a first and a second part movable away from each other and back again, from a receiving position for taking up such a product to a discharge position for delivering the product downwardly therefrom, said at least one row being included in a frame and being removeably and interlockably arranged in the frame,
    the first part from one of at least one row being mounted on a first carrier and the second part from the one row being mounted on a second carrier, wherein, for the purpose of making removeable said at least one row, said carriers are arranged removeably and interlockably in the frame, and the carriers each being provided with an interlock at the ends thereof; and
    the interlock comprising two fitting connection halves, of which one half is on the carrier and the other half is on the frame, and a fit retainer, wherein one half is a pin provided on the frame, the other half is a slot provided in the carrier and fitting around the pin, and the fit retainer is a retaining bush biased around the halves.

2. The apparatus according to claim 1, wherein one said row is provided:

at an upper, first height, positioned immediately under the endless sorting conveyor, functioning as at least one receiving row of receiving units, whereby the products are discharged in a well-defined manner from the sorting conveyor into the receiving units and are received by these receiving units, with a receiving position for taking up such a product, and with a discharge position for delivering the product downwardly therefrom, at an at least second height thereunder, functioning as at least one intermediate row of buffering units for taking up, buffering, and in turn delivering such a product, with the buffer units being similar to the receiving units, for taking up the products from the receiving units and discharging the product downwardly in a well-defined manner, and at a further height under said at least second height, and positioned above the packaging device, functioning as at least one delivery row of delivery units, for taking up products from the buffer units and delivering the products in a well-defined manner into the packaging devices, with the delivery units being similar to the receiving units and the buffer units.

3. The apparatus according to claim 1, wherein the retaining bush is biased with a spring with stop.

4. The apparatus according to claim 3, wherein the stop is provided on the carrier.

5. The apparatus according to claim 3, wherein the stop is provided on the frame.

6. An apparatus for transferring products, said apparatus comprising:

an endless sorting conveyor;

a packaging device; and at least one row of conveying units, the at least one row of conveying units being positioned under the endless sorting conveyor at least one height, wherein, in use, products are discharged in a well-defined manner from the sorting conveyor into the conveying units, are received by the conveying units, and are subsequently delivered to the packaging device thereunder, wherein each conveying unit includes at least a first part and a second part movable away from each other and back again, from a receiving position for taking up a product to a discharge position for delivering the product downwardly therefrom, said at least one row being included in a frame and being removeably and interlockably arranged in the frame, the first part from one of the at least one row being mounted on a first carrier and the second part from the one row being mounted on a second carrier, wherein, for the purpose of making removeable said at least one row, said carriers are arranged removeably and interlockably in the frame, the carriers each being provided with an interlock at the ends thereof, the interlock includes two fitting connection halves, of which one half is on the carrier and the other half is on the frame, and a fit retainer, one half being a pin provided on the carrier, the other half being a slot provided in the frame and fitting around the pin, the fit retainer being a retaining bush biased around the halves.

7. The apparatus according to claim 6, wherein one said row is provided:

at an upper, first height, positioned immediately under the endless sorting conveyor, functioning as at least one receiving row of receiving units, whereby the products are discharged in a well-defined manner from the sorting conveyor into the receiving units and are received by these receiving units, with a receiving position for taking up such a product, and with a discharge position for delivering the product downwardly therefrom.

8. The apparatus according to claim 7, wherein one said row is provided:

at an at least second height under the first height, functioning as at least one intermediate row of buffering units for taking up, buffering, and in turn delivering such a product, with the buffer units being similar to the receiving units, for taking up the products from the receiving units and discharging the product downwardly in a well-defined manner.

9. The apparatus according to claim 8, wherein one said row is provided:

at a further height under said at least second height, and positioned above a packaging device, functioning as at least one delivery row of delivery units, for taking up products from the buffer units and delivering the products in a well-defined manner into the packaging devices, with the delivery units being similar to the receiving units and the buffer units.

10. The apparatus according to claim 6, wherein the retaining bush is biased with a spring with stop.

11. The apparatus according to claim 10, wherein the stop is provided on the carrier.

12. The apparatus according to claim 10, wherein the stop is provided on the frame.

13. An apparatus for transferring products, comprising:

at least one row of conveying units;

an endless sorting conveyor;

and a packaging device; and the at least one row of conveying units, the at least one row being positioned under the endless sorting conveyor at least one height, wherein, in use, the products are discharged in a well-defined manner from the sorting conveyor into the conveying units, are received by the conveying units, and are subsequently delivered to the packaging device thereunder, wherein each conveying unit includes at least a first and a second part movable away from each other and back again, from a receiving position for taking up such a product to a discharge position for delivering the product downwardly therefrom, said at least one row being included in a frame and being removeably and interlockably arranged in the frame, the first part from one of said at least one row being mounted on a first carrier and the second part from the one row being mounted on a second carrier, wherein, for the purpose of making removeable said at least one row, said carriers are arranged removeably and interlockably in the frame, the carriers each being provided with an interlock at the ends thereof, the interlock includes two fitting connection halves, of which one half is on the carrier and the other half is on the frame, and a fit retainer, wherein the one half is a pin provided on the frame, the other half is a slot provided in the carrier and fitting around the pin, the fit retainer is a retaining bush biased around the halves.

14. The apparatus according to claim 13, wherein one said row is provided:

at an upper, first height, positioned immediately under the endless sorting conveyor, functioning as at least one receiving row of receiving units, whereby the products are discharged in a well-defined manner from the sorting conveyor into the receiving units and are received by these receiving units, with a receiving position for taking up such a product, and with a discharge position for delivering the product downwardly therefrom.

15. The apparatus according to claim 14, wherein one said row is provided:

at an at least second height under the first height, functioning as at least one intermediate row of buffering units for taking up, buffering, and in turn delivering such a product, with the buffer units being similar to the receiving units, for taking up the products from the receiving units and discharging the product downwardly in a well-defined manner.

16. The apparatus according to claim 15, wherein one said row is provided:

at a further height under said at least second height, and positioned above a packaging device, functioning as at least one delivery row of delivery units, for taking up products from the buffer units and delivering the products in a well-defined manner into the packaging devices, with the delivery units being similar to the receiving units and the buffer units.

17. The apparatus according to claim 13, wherein the retaining bush is biased with a spring with stop.

18. The apparatus according to claim 17, wherein the stop is provided on the carrier.

19. The apparatus according to claim 17, wherein the stop is provided on the frame.

* * * * *